UNITED STATES PATENT OFFICE.

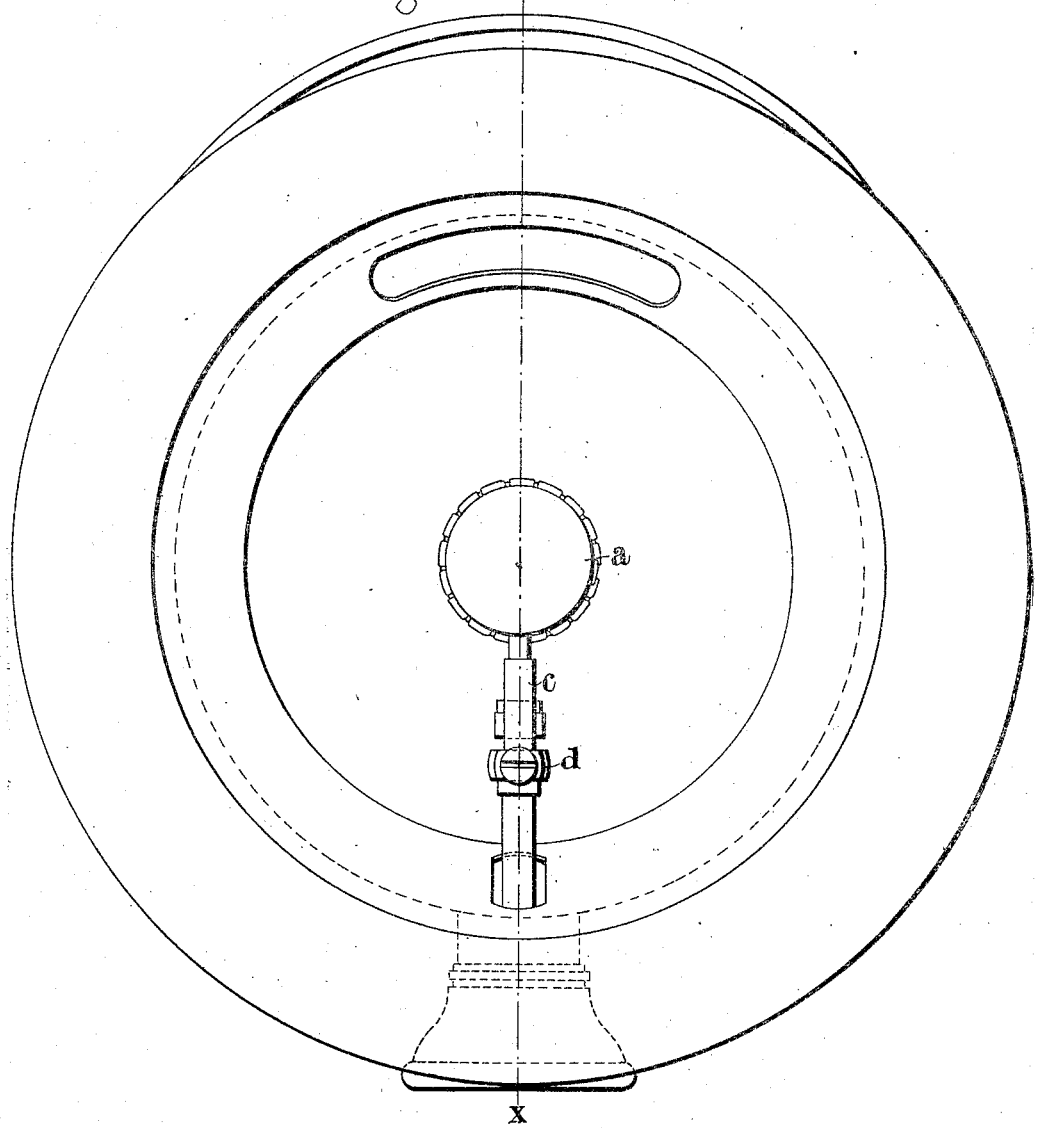

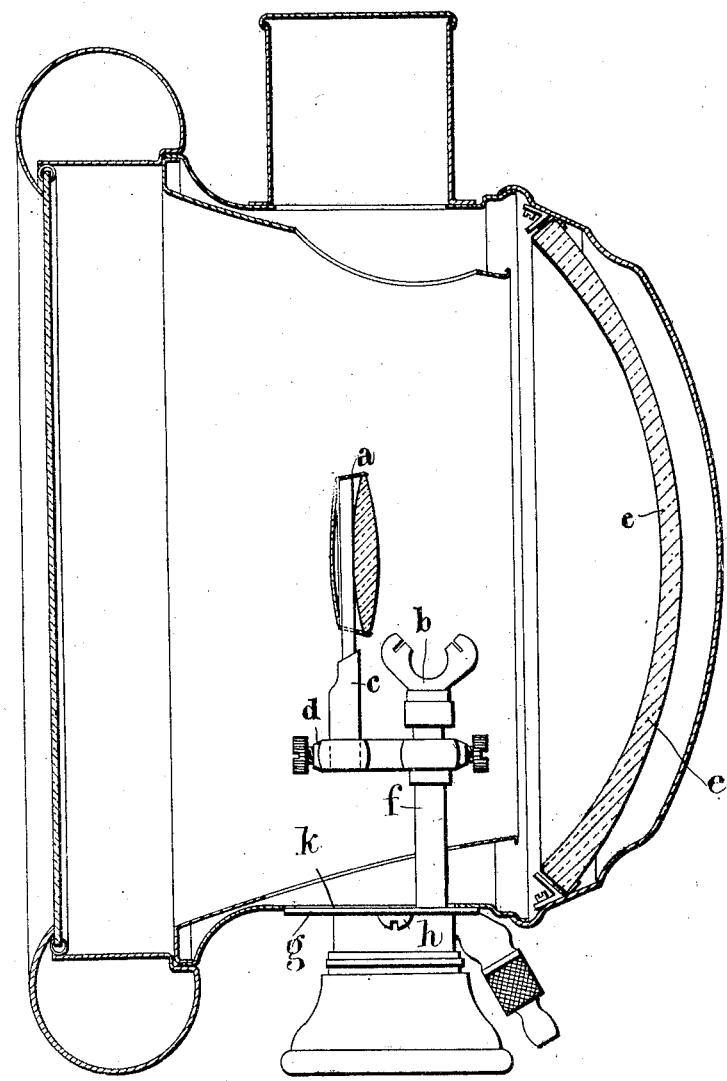

HENRY SALSBURY AND THOMAS WHITAKER, OF LONDON, ENGLAND.

SEARCH-LIGHT.

1,044,252.      Specification of Letters Patent.      Patented Nov. 12, 1912.

Application filed July 15, 1908. Serial No. 443,637.

*To all whom it may concern:*

Be it known that we, HENRY SALSBURY, a subject of the King of Great Britain and Ireland, and residing at No. 124 Long Acre, London, England, and THOMAS WHITAKER, a subject of the King of Great Britain and Ireland, and residing at No. 14 Blandfields street, Balham, London, England, have invented certain new and useful Improvements in or Relating to Search-Lights, of which the following is a specification.

This invention relates to lamps adapted to throw a beam of light, such as search, automobile, or other vehicle lights.

The object of the invention is to increase the intensity of the beam of light projected from a lamp without increasing the size or power of the burner.

By means of the invention a considerably greater cone of light from the front of the flame is utilized than has heretofore been possible, this light being caused to fall on the main reflector so that the intensity of the beam produced by a given burner is greatly increased.

Referring to the accompanying drawings, Figure 1 is a front elevation of a lamp constructed according to the invention with the front removed. Fig. 2 is a section on the line X X Fig. 1.

In the lamp illustrated a small mirror $a$ is fitted immediately in front of the burner $b$, the mirror $a$ being formed by silvering a double convex lens on the side away from the burner, and it will be seen from the drawing that the mirror $a$ is mounted in a socket $c$ adapted to fit in a support $d$ adapted to carry the mirror at a given fixed distance from the burner $b$, and, as illustrated, it will be seen that the flame will be substantially in the focus of the lens mirror $a$. The lamp is provided with a main reflector $e$ in a fixed position, while the burner and lens mirror $a$ are mounted on a pillar $f$ fixed to a sliding piece $g$ which is held by means of a screw $h$ passing through a slot $k$ in the casing of the lamp. It will be seen that the beam of light projected by this mirror may be made more or less divergent. In the position illustrated the focus of the main reflector $e$ is slightly outside the center of the flame produced by the burner $b$, and as the reflecting surface of the main reflector is substantially parabolic; a slightly divergent beam will be produced by the light coming straight from the back of the flame to the main reflector and being then projected in the forward direction. It will be seen that the lens mirror $a$ is so placed in relation to the flame that it will catch a considerable cone of light coming direct from the flame, and in the ordinary lamp the whole of this light would be diffused and lost. By the use of the lens mirror $a$ in the manner illustrated, this cone of light is reflected back into the main reflector and again projected forward, and as the lens mirror is farther from the reflector than the flame, the light which falls on the lens mirror and is then projected by the main mirror will be necessarily more convergent than the light projected from the main reflector. A circular obstruction such as that formed by the lens mirror $a$, if it did not reflect, would cause a shadow in the center of the beam of light projected by the main reflector $e$, and by reason of the fact that the light from the front of the flame and falling on the lens mirror $a$ and then projected by the main mirror $e$ is more convergent than the light which falls from the flame directly on the main reflector $e$ it is rendered possible, by the arrangement illustrated, to fill up the central portion of the beam which would otherwise be in shadow, so that, although a portion of the directly projected beam is intercepted, the actual illumination in the center of the beam may be increased by means of this invention, the extra light coming from the front of the flame so that a wide-angled cone of light which would otherwise be diffused, is utilized. Further, by shifting the burner and lens mirror $a$ together in the direction of the axis of the main reflector a more or less divergent beam can be produced. Further, by the use of a mirror of the form of a double convex lens silvered on one side it is possible to obtain a mirror of a very short focal length, which can therefore be placed very close to the flame so as to collect a very wide-angled cone of light from the front of the flame, the whole of which can be utilized in the projected beam instead of being diffused. Also it will be seen that by the use of a short focus lens mirror the shadow caused by obstructing the ordinary projected light from the back of the flame will be reduced to a minimum.

Having now described our invention what we claim as new and desire to secure by Letters Patent:—

A lamp for motor vehicles and the like comprising in combination a main parabolic reflector having an unbroken parabolic reflecting surface over its whole area, a burner in front of the said reflector, a centrally placed auxiliary reflector in the axis of said main reflector and in front of said burner, said auxiliary reflector comprising a double convex lens silvered on the side remote from said main reflector and reflecting over the whole of the area included within its outer circumference, as and for the purposes described.

In testimony whereof we have signed our names to this specification in the presence of two subscribing witnesses.

HENRY SALSBURY.
THOMAS WHITAKER.

Witnesses to the signature of Henry Salsbury:
WILLIAM BRYSON,
BERTRAM H. MATTHEWS.

Witnesses to the signature of Thomas Whitaker:
BERTRAM H. MATTHEWS,
G. F. WARREN.

---

Copies of this patent may be obtained for five cents each, by addressing the "Commissioner of Patents, Washington, D. C."